No. 682,884. Patented Sept. 17, 1901.
T. O. ORGAN.
FEED WATER PURIFIER.
(Application filed May 29, 1901.)

(No Model.)

Witnesses

Inventor
Thomas O. Organ,
By
Attorney

UNITED STATES PATENT OFFICE.

THOMAS O. ORGAN, OF PHILADELPHIA, PENNSYLVANIA.

FEED-WATER PURIFIER.

SPECIFICATION forming part of Letters Patent No. 682,884, dated September 17, 1901.

Application filed May 29, 1901. Serial No. 62,406. (No model.)

*To all whom it may concern:*

Be it known that I, THOMAS O. ORGAN, of Philadelphia, in the county of Philadelphia and State of Pennsylvania, have invented certain new and useful Improvements in Feed-Water Purifiers; and I do hereby declare the following to be a full, clear, and exact description of the invention, such as will enable others skilled in the art to which it appertains to make and use the same.

This invention contemplates certain new and useful improvements in feed-water purifiers.

The primary object of the invention is to provide improved means for supplying a feed-water-purifying compound to feed-water heaters or storage-tanks such as provide a supply for locomotives and also to settling-tanks used in dye-houses, where pure water is required, avoiding the supply of acids to the feed-pipes or feed-pump of boiler.

The invention will be hereinafter fully set forth, and particularly pointed out in the claims.

Figure 1:
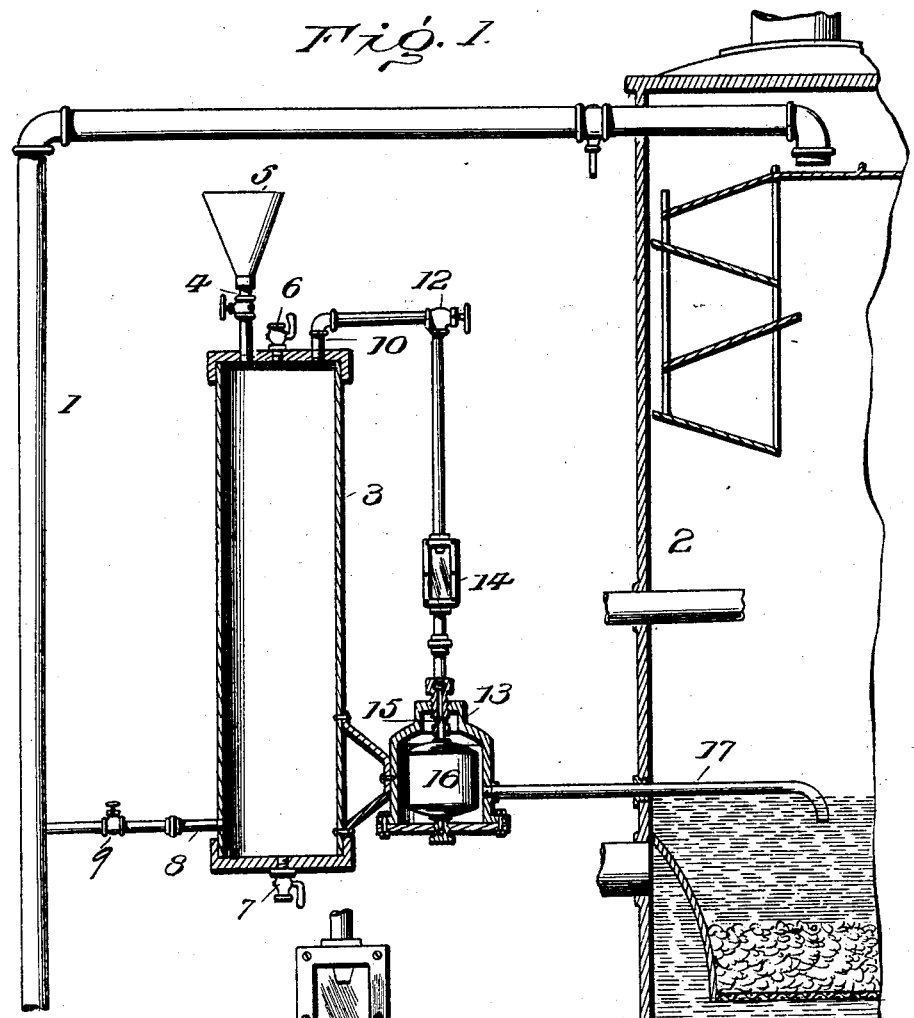
Figure 2:
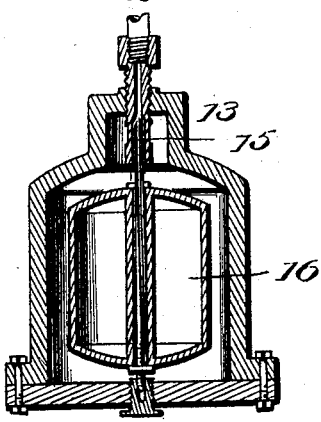

In the accompanying drawings, Figure 1 shows in side elevation, with parts in section, the application of my improvements. Fig. 2 is an enlarged vertical sectional view.

Referring to the drawings, 1 designates the water-supply pipe connecting with a city main, and 2 a feed-water heater, a portion only of which is shown and into which, at or near its top, opens the pipe 1.

3 is a chemical-containing tank wherein is placed suitable acids for effecting the precipitation of all scale-forming particles usually present in feed-water. This tank is provided at its top with a valve-controlled charging-pipe 4, having a funnel 5, and adjacent to said pipe is an air-cock 6, while in the bottom of the tank is a drain-valve 7. At or near its bottom tank 3 is connected by a water-supply pipe 8 with the main supply-pipe 1, the entrance of water through this pipe to the tank being controlled by a valve 9. The tank 3 at its top has an outlet-pipe 10, equipped with a valve 12 and opening into a valve-casing 13, adjacent to which is a sight-feed-gage attachment 14. Within casing 13 is a valve 15, carried by a float 16. The water passes from casing 13, through pipe 17, into the feed-water heater, into which it is discharged at a point just below the working water-level, the inner end of said pipe being bent downwardly to prevent hammering by the entrance of steam thereinto. When the water rises above the working level, float 16 will effect the closing of valve 15, and thereby cut off the further supply of chemically-charged water. This closing of the valve by the water-levels in the tank will take place when water is not being drawn off—that is, when the force-pump is not working—and thus excess supply of chemicals to the water is prevented. The discharge from tank 3 is controlled by valve 12 and is visible through the sight-feed attachment 14.

In practice valves 9 and 12 are closed, and after the tank 3 is emptied through drain-valve 7 the latter is then closed and chemicals are supplied through valve-pipe 4, the air-cock 6 being open during this charging. Then the valve of pipe 4 and also the cock 6 are closed and valves 9 and 12 are opened to permit a portion of the water passing through pipe 1 to travel through pipe 8, tank 3, and discharge-pipe 10. The water thus deflected from pipe 1 enters the feed-water heater or storage-tank or settling-tank, as the case may be, sufficiently charged with acid or water-purifying compound to effect the precipitation in the tank or heater of all scale-forming particles. Hence the water entering the feed-pipes or the feed-pump is pure, all precipitation having occurred and the acids having been neutralized before the water enters the feed-pipes.

The advantages of my invention are apparent. Among these may be noted that I avoid forcing large quantities of water-purifying compounds into the feed apparatus or boiler, that this compound is admitted to the water when the latter is at or below the working line in cold-water-storage tanks or open feed-water heaters, and that if the attachment should be connected to a heater and the drips from the heating system should overflow the supply of the purifying compound is promptly cut off, preventing any excess of feeding such compounds and avoiding foaming in a steam-boiler.

I claim as my invention—

1. The combination with a feed-water tank and the supply-pipe opening thereinto, of a receptacle containing a water-purifying compound connected to said supply-pipe and to said tank for automatically supplying the latter with scale-precipitating compounds, and means actuated by the water-levels in the tank for automatically cutting off such supply, as set forth.

2. The combination with a feed-water tank and the supply-pipe opening thereinto, of a receptacle containing a water-purifying compound, a valved connection between said receptacle and tank, a connection between the latter and said supply-pipe, a second valve in the connection between the receptacle and tank, and means for automatically actuating the same to cut off the supply from the receptacle to the tank, such means being controlled by the water-levels in the latter, as set forth.

3. The combination with a feed-water tank and the supply-pipe thereof, of a receptacle containing a water-purifying compound, a valved pipe connecting said supply-pipe and receptacle, an outlet-pipe leading from said receptacle to said tank, a sight-feed attachment within such pipe, a valve-casing, a valve therein for automatically cutting off the supply from the receptacle, the pipe connecting said valve-casing to the tank opening into the latter below the working level, and a float in said casing for actuating the valve therein, as set forth.

4. The combination with a water-supply tank, and the supply-pipe therefor opening thereinto, of a chemical-containing tank having a water-supply connection at one end with said supply-pipe, and a water-discharge connection at its other end with said supply-tank, and means actuated by the water-levels in the tank for automatically cutting off such discharge when the water in the supply-tank reaches a predetermined level, as set forth.

5. The combination with the water-supply tank, and the supply-pipe therefor opening thereinto, of a chemical-containing tank having a water-supply connection at one end with said supply-pipe, a valved discharge-pipe leading from the other end of such latter tank, a casing into which such pipe opens, a valve and float in said casing for automatically cutting off the discharge from such pipe, and a pipe extended from said casing into said supply-tank having its inner end bent downward below the working water-level, substantially as set forth.

In testimony whereof I have signed this specification in the presence of two subscribing witnesses.

THOMAS O. ORGAN.

Witnesses:
G. ALFRED KOCH,
HERMAN W. SULZER.